(12) United States Patent
Baxter et al.

(10) Patent No.: US 7,618,198 B2
(45) Date of Patent: Nov. 17, 2009

(54) HARSH ENVIRONMENT CONNECTOR

(75) Inventors: Peter R. Baxter, Ormond Beach, FL (US); Srikanth Ramasubramanian, Ormond Beach, FL (US); Stewart M. Barlow, Ormond Beach, FL (US)

(73) Assignee: Teledyne ODI, Inc., Daytona Beach, FL (US)

( * ) Notice: Subject to any disclaimer, the term of this patent is extended or adjusted under 35 U.S.C. 154(b) by 0 days.

(21) Appl. No.: 12/236,324

(22) Filed: Sep. 23, 2008

(65) Prior Publication Data

US 2009/0080837 A1 Mar. 26, 2009

Related U.S. Application Data

(60) Provisional application No. 60/974,738, filed on Sep. 24, 2007.

(51) Int. Cl.
G02B 6/36 (2006.01)
(52) U.S. Cl. .............................. 385/53; 385/54; 385/55
(58) Field of Classification Search .................. 385/53, 385/54, 55
See application file for complete search history.

(56) References Cited

U.S. PATENT DOCUMENTS

| | | | |
|---|---|---|---|
| 3,845,450 A | 10/1974 | Cole et al. | |
| 4,373,767 A | 2/1983 | Cairns | |
| 4,411,491 A | 10/1983 | Larkin et al. | |
| 4,666,242 A | 5/1987 | Cairns | |
| 4,682,848 A | 7/1987 | Cairns et al. | |
| 4,696,540 A | 9/1987 | Adams et al. | |
| 4,795,359 A | 1/1989 | Alcock et al. | |
| 4,948,377 A | 8/1990 | Cairns | |
| 5,194,012 A | 3/1993 | Cairns | |
| 5,203,805 A | 4/1993 | Cairns | |
| 5,685,727 A | 11/1997 | Cairns | |
| 5,738,535 A | 4/1998 | Cairns | |
| 5,838,857 A | 11/1998 | Niekrasz | |
| 6,095,838 A | 8/2000 | Brickett | |
| 6,315,461 B1 | 11/2001 | Cairns | |
| 6,736,545 B2 | 5/2004 | Cairns et al. | |

FOREIGN PATENT DOCUMENTS

| | | |
|---|---|---|
| EP | 0538089 A1 | 4/1993 |
| FR | 2529396 | 12/1983 |
| GB | 2264201 A | 8/1993 |

*Primary Examiner*—Jennifer Doan
(74) *Attorney, Agent, or Firm*—Procopio, Cory, Hargreaves & Savitch LLP

(57) ABSTRACT

First and second connector units each have a contact chamber with a front wall having an opening closed by a stopper. Seals in the respective openings surround and seal the stoppers prior to mating. The stopper in the first connector unit is retracted into the housing during mating while the front wall of second connector unit is retracted into its housing during mating, pushed back by the front wall of the first connector unit, separating the stoppers from the end wall openings and allowing communication between the contact chambers through a passageway defined by the aligned openings. The seals in the end walls seal the passageway during and after mating. A contact assembly in the first connector unit moves transversely into alignment with the passageway for contact with a corresponding fixed contact assembly in the second connector unit as the units move into mating engagement.

46 Claims, 6 Drawing Sheets

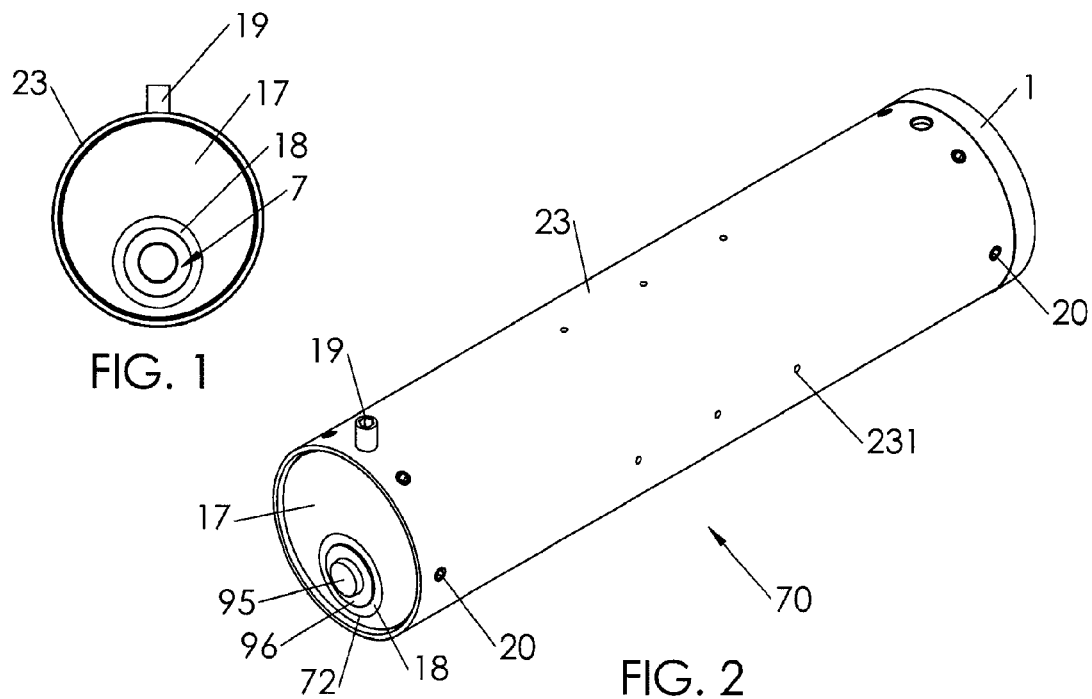
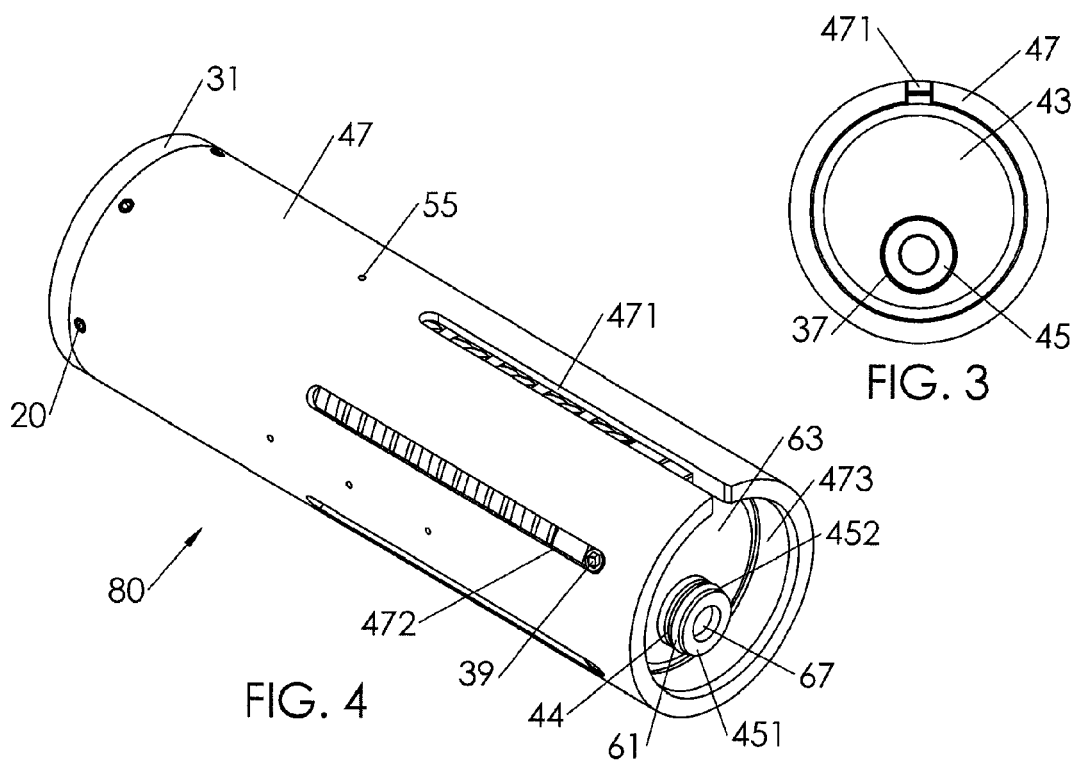

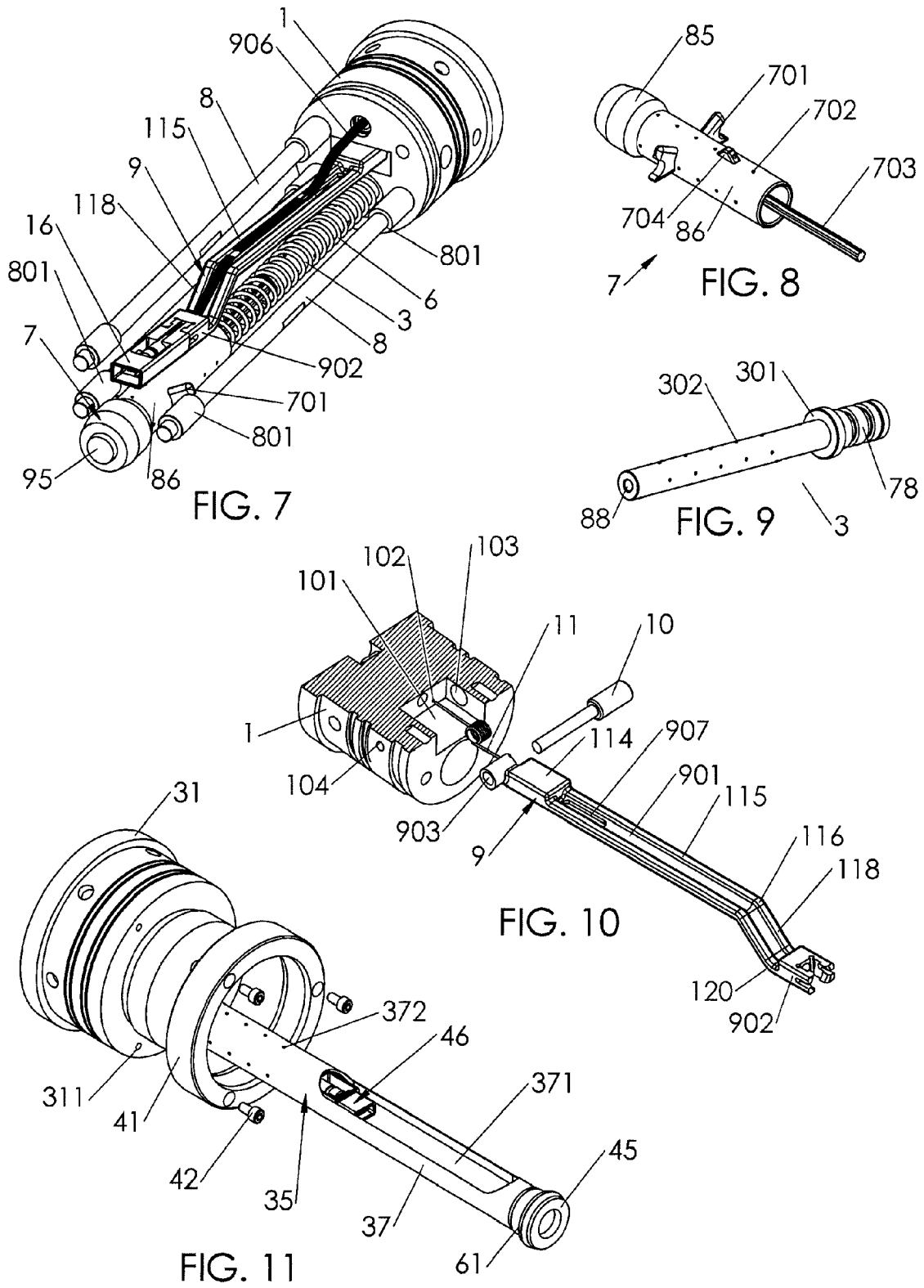

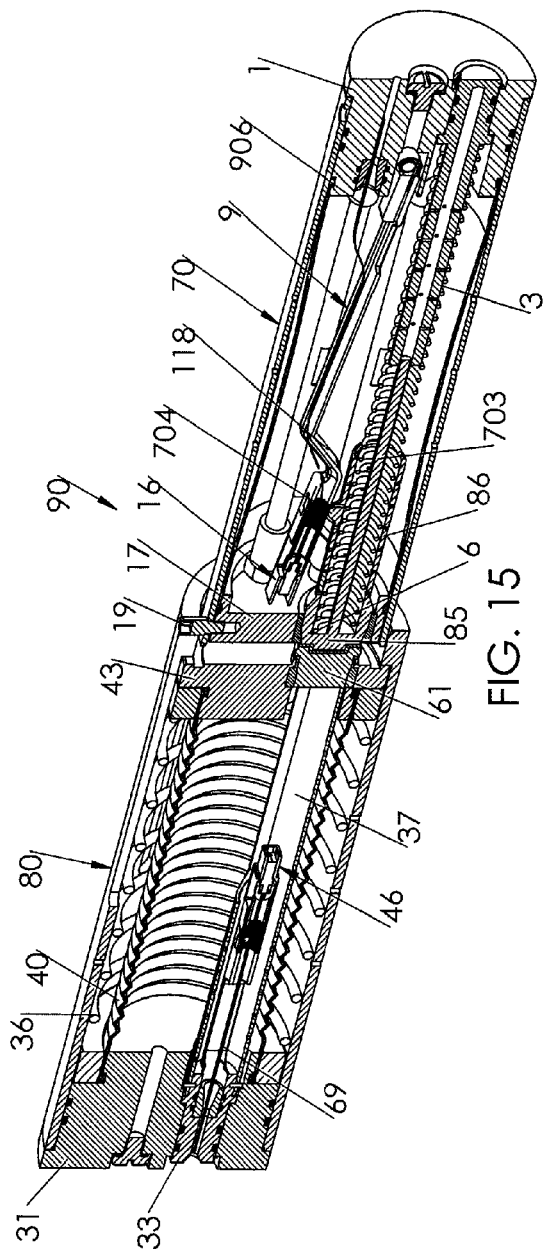
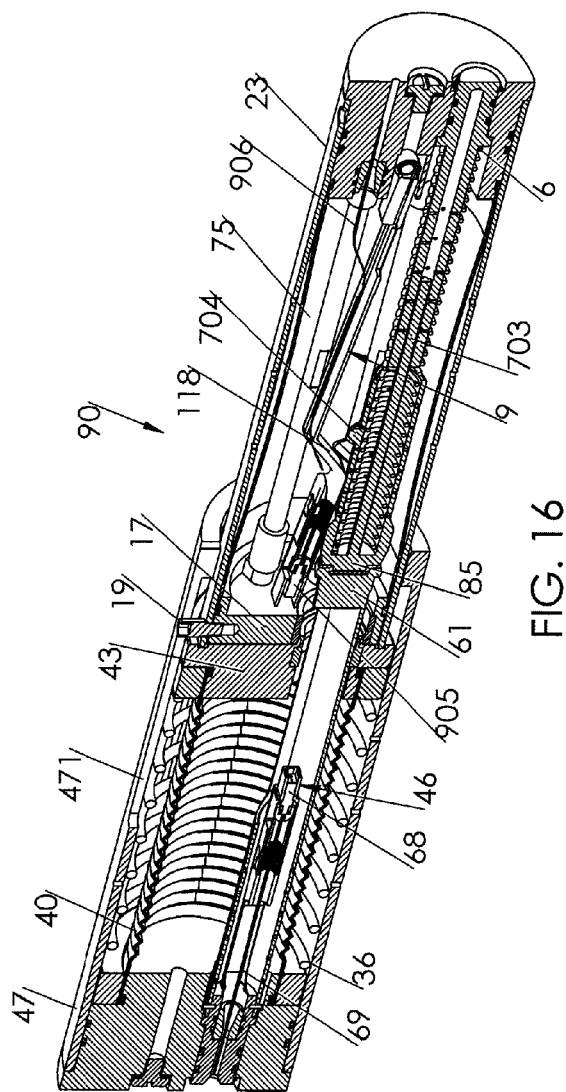

HARSH ENVIRONMENT CONNECTOR

RELATED APPLICATION

The present application claims the benefit of U.S. provisional patent application No. 60/974,738, filed Sep. 24, 2007, the contents of which are incorporated herein by reference in their entirety.

BACKGROUND

1. Field of the Invention

The present invention relates generally to harsh environment connectors such as wet mate connectors which can be mated and unmated in a wet environment such as underwater and which are exposed to a harsh working environment, such as seawater.

2. Related Art

There are many types of connectors for making electrical and fiber-optic cable connections in hostile or harsh environments, such as undersea connectors which can be repeatedly mated and demated underwater at great ocean depths. These connectors typically consist of plug and receptacle units or connector parts, each attached to cables or other devices intended to be joined by the connectors to form completed circuits. To completely isolate the contacts to be joined from the ambient environment, one or both halves of these connectors house the contacts in oil-filled, pressure-balanced chambers.

Both the plug and receptacle halves of most fiber-optical connectors which are mateable in a harsh environment have oil-filled chambers. The chambers are typically brought face-to-face during an early step of the mating sequence. In a subsequent mating step, one or more connective passages, sealed from the outside environment, are created between the chambers of the mating connector halves. The passages join the two oil-filled chambers, creating a single, connected oil volume. Actual connection of the contact junctions then takes place within the common oil chamber. There are several patented examples of such connectors, such as U.S. Pat. Nos. 4,682,848; 5,738,535; 5,838,857; 6,315,461, and 6,736,545.

Some such existing connectors work very well. The technology is relatively new, however, and there is still much room for improvement. In particular, the existing products are complex, expensive, and their reliability is not flawless.

One major problem in designing such connectors for mating in an undersea environment or other harsh environments is the provision of seals which will adequately exclude seawater and other contamination from the contact member even after repeated mating and demating, and also prevent fill fluid from leaking out of the chamber.

A number of different sealing mechanisms have been proposed in the past for achieving this objective. One such sealing mechanism has an opening into the contact chamber which comprises an elastomeric tubular entrance surrounded by an elastomeric sphincter which pinches the entrance closed upon itself when the plug and receptacle units are in an unmated condition. On mating, the contact probe is forced through the opening and the sphincter pinches against the probe to form a seal. Although this type of seal is successful in some cases, it does have disadvantages. One disadvantage is that this seal does not work well under all hostile conditions. Another disadvantage is that such seals tend to lose their "memory" after repeated mating and demating, so that they may fail to close completely, or may not close quickly enough to isolate the chamber from the surrounding environment when the units are demated.

Another type of known seal mechanism comprises a piston which moves axially into the seal opening as the units are demated. In some known underwater electrical connectors, such as that described in U.S. Pat. Nos. 4,795,359 and 5,194,012 of Cairns, tubular socket contacts are provided in the receptacle unit, and spring-biased pistons are urged into sealing engagement with the open ends of the socket assemblies. As the plug and receptacle units are mated, pins on the plug portion urge the pistons back past the contact bands in the sockets, so that electrical contact is made. However, this type of arrangement cannot be used in a straightforward way for an optical connector since the optical contacts must be able to engage axially for practical purposes.

Another line of wet-mateable connectors is of the type as described in U.S. Pat. No. 6,736,545 of Cairns et al., for example. The patent discloses a wet-mateable connector comprising first and second connector portions movable between unmated and mated positions. In addition, the connector also includes first and second bladders in respective connector portions and cooperating therewith so that opposing ends of the bladders are sealably urged together and moved from a closed to an open position as the connector portions are moved from the unmated to the mated position. One possible disadvantage of such connectors is that the shape of the opening in the ends of the bladders may not be large enough when open to use higher fiber counts, for example.

Therefore, what is needed is a system and method that overcomes these significant problems found in prior wet mate connectors as described above.

SUMMARY

Embodiments described herein provide a new wet mate optical connector with relatively high optical-circuit density.

According to one aspect of the present invention, a wet mate optical connector is provided which comprises first connected unit or a plug unit and a second connector unit or receptacle unit which are releasably mateable together, each unit incorporating an oil-filled chamber housing one or more contact elements to be joined. Each oil chamber is pressure balanced to the outside environment by way of flexible elements that adjust the chamber's size to compensate for volumetric changes of its contents. When the connector halves are mated, elastomeric seal assemblies of the plug and receptacle move into engagement, sealing the plug-receptacle interface from the outside environment.

In one embodiment, the plug unit contains one or a plurality of optical circuits which terminate in contacts, while the receptacle unit contains a corresponding number of optical circuits which terminate in contacts which are mated with the contacts in the receptacle unit when the two units are mated.

In one embodiment, the plug and receptacle units each have a shell or housing and a contact chamber in each housing has a forward end wall with at least one opening closed by a stopper in the unmated condition. The stopper in the plug unit is spring-loaded into an extended position and is retracted into the housing during mating. The stopper in the receptacle unit is fixed at the end of a sleeve and the forward end wall is retractable into the receptacle shell during mating, pushed back by the forward end of the plug unit, so that the receptacle stopper extends through the aligned opening in the end wall of the plug unit and into the plug unit housing. Each opening contains a hollow seal member which engages over the respective stopper to provide a seal when the connector units are unmated. A face or gasket seal extends over the forward end of at least one stopper for face to face sealing engagement with the other stopper during mating.

The optical circuits in the plug unit of one embodiment are mounted on a movable arm with the contacts located at the forward end of the arm. The arm is movable transversely between a first, unmated condition in which the forward end of the arm is offset from the opening in the forward end wall, and a second, operative position in which it is aligned with the opening in the forward end wall with the contacts positioned for contact with the corresponding contacts in the receptacle unit as the plug unit moves into mating engagement with the receptacle unit. The arm is biased into the second position and is held in the first position until the stopper is retracted rearwardly into the housing or shell during mating. The contacts in the receptacle unit are located in the receptacle sleeve at a location spaced rearward from the stopper, and the sleeve has a slot which receives the contact carrying end of the arm when the arm is biased into the second position. When the plug and receptacle units move into full mating engagement, the two sets of contacts are mated.

In another embodiment, the contacts may be electrical rather than optical contacts, or both electrical and optical contacts, and each connector unit may have only a single contact rather than plural contacts.

In one embodiment, the movable arm has a rear end pivotally mounted in the plug unit for rotation about an axis transverse to the arm, and a forward end carrying one or more contacts, and the arm is spring biased from the first position towards the second position. The arm is not straight and has a first portion extending from the rear end, a first bend at the end of the first portion, a second portion extending at an angle to the first portion from the first bend, a second bend in the opposite direction to the first bend, and a third portion extending from the second bend up to the forward end at an angle to the second portion. The third portion of the arm is located in the sleeve containing the receptacle contact or contacts in the second position of the arm while the first portion is offset from the third portion and outside the sleeve. The first and third portions of the arm are substantially parallel in one embodiment. The spring may be a torsion spring mounted at the pivoted rear end of the arm.

Seals are provided between each stopper and the opening in the end wall of the respective connector unit so that the chambers are sealed in the unmated condition of the units. Each seal is tubular and is bonded in the respective end wall opening. An additional seal is provided on the front end face of one of the stoppers for sealing engagement with the end face of the other stopper during mating and in the mated condition. As the units are mated together, the receptacle stopper pushes back the plug stopper and moves into sealing engagement with the seal in the front end wall of the plug unit. At the same time, the seal in the front end wall of the plug unit moves into sealing engagement with the seal on the stopper of the receptacle unit. The seals may have tapered portions which provide a wiper mechanism for wiping any debris away from the chambers.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 is an end view of a first connector unit or plug unit forming part of one embodiment of a connector;

FIG. 2 is a perspective view of the plug unit of FIG. 1;

FIG. 3 is an end view of a second connector unit or receptacle unit designed for releasable mating engagement with the plug unit of FIGS. 1 and 2;

FIG. 4 is a perspective view of the receptacle unit of FIG. 3;

FIG. 7 is a perspective view of some of the internal components of the plug unit, with the outer shell and other components removed to reveal the illustrated components;

FIG. 8 is a perspective view of the plug stopper assembly;

FIG. 9 is a perspective view of the plug stem;

FIG. 10 is a partially cut-away perspective view of the contact guide arm assembly of the plug unit, illustrating the spring-loaded mounting of the arm assembly on the plug base;

FIG. 11 is a perspective view of receptacle base and stopper assembly with other parts of the receptacle unit removed to reveal these components;

FIG. 15 is a sectional perspective view of the plug and receptacle units at the initial mating stage of FIG. 12;

FIG. 16 is a sectional perspective view of the plug and receptacle units at a similar position to FIG. 14;

DETAILED DESCRIPTION

Figure 5:
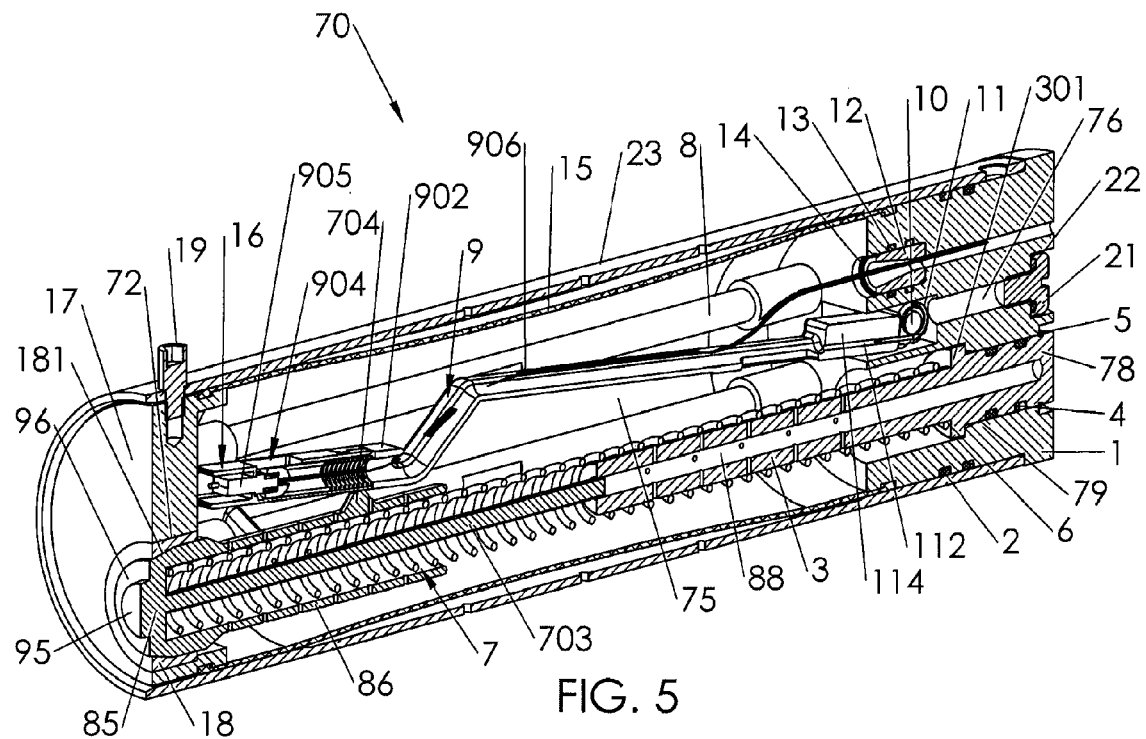
FIG. 5 is a cut-away, longitudinal sectional perspective view of the plug unit of FIGS. 1 and 2.

Certain embodiments as disclosed herein provide for a wet mate optical connector which may be mated and unmated in a harsh environment, such as underwater or harsh environment, and has contact chambers which are sealed both in the mated and unmated conditions. Although primarily designed for undersea use, the connector may be used in any harsh environment. Although the disclosed embodiments are concerned with an optical connector, the contacts or may be electrical contacts or both electrical and optical contacts in alternative embodiments.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

FIGS. 1 to 11 illustrate an embodiment of a wet mateable optical connector 90 comprising a first connector unit or plug unit 70 and a second connector unit or receptacle unit 80 designed for releasable mating engagement, while FIGS. 12 to 19 illustrate successive stages as the plug and receptacle units are connected together.

The receptacle or second connector unit 80 is illustrated in an unmated condition in FIGS. 3, 4, 6 and 11, and has an outer rigid shell or housing 47 sealed at its rear end by base 31 secured by fasteners 20. Shell 47 has an open forward end or entry region 473. O-ring seals 32 are provided between the base 31 and the inner wall of shell 47. A forward end plate or wall 43 of metal or other rigid material is slidably mounted in the shell and biased into the extended or forward position of FIG. 6 by a spring 36 acting between a forward end of base 31 and the end plate 43. End plate 43 has an opening 62 into which an enlarged stopper 61 at the forward end of a stopper assembly 35 extends in the unmated condition of FIG. 6. Spring 36 urges end plate 43 outward or forward into engagement with a shoulder 52 formed in the inner surface of shell 47. A flexible compensator sleeve or bladder 40 of diameter less than that of spring 36 extends between the base 31 and end plate 43 and has a first end secured in a groove in end plate 43 by a first retainer ring 41 and a second end secured in a groove in base 31 by a second retainer ring 41. Bladder 40 surrounds a first contact chamber 54 extending between base 31 and end plate 43. Chamber 54 is filled with a dielectric oil or other mobile substance. Vent holes 55 in the shell 47 allow the outside environment to act against compensator or flexible bladder 40 for pressure compensation purposes.

Figure 6:
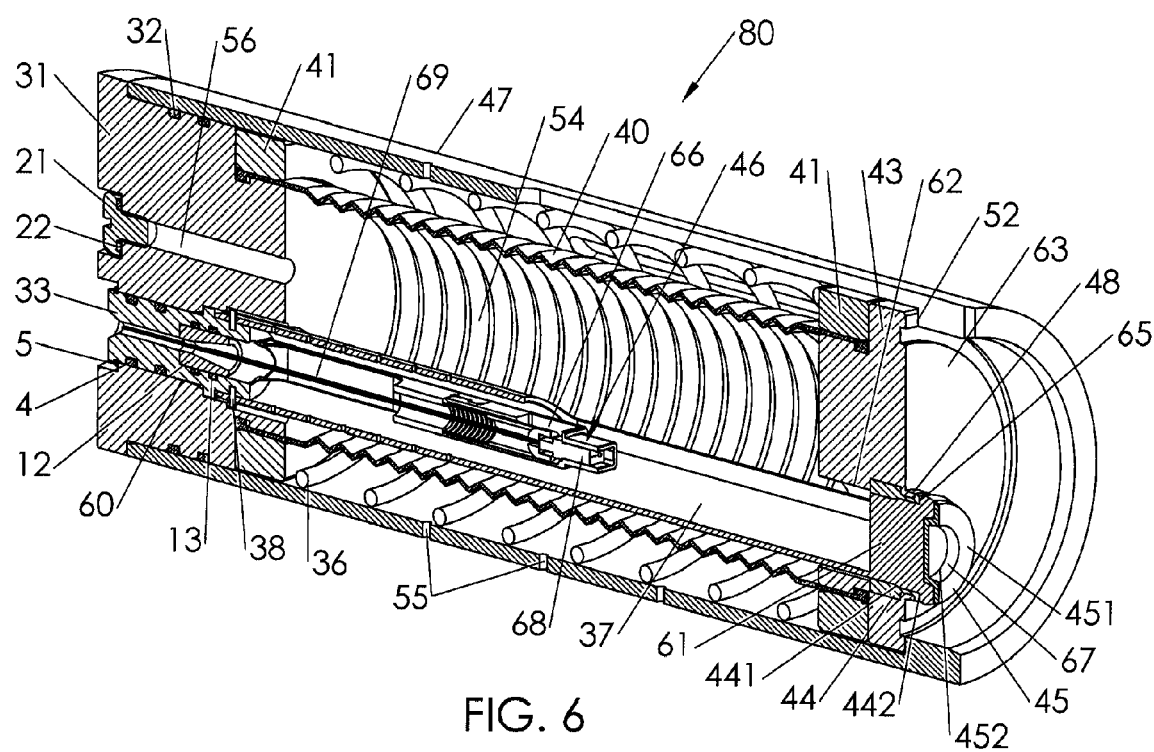
FIG. 6 is a cut-away, longitudinal sectional perspective view of the receptacle unit of FIGS. 3 and 4.

As best illustrated in FIGS. 6 and 11, stopper assembly 35 comprises a sleeve 37 which has a rear end secured in base 31 and extends forward from the base through the contact chamber 40, terminating with enlarged stopper 61 which engages in the end plate opening 62 in the unmated condition of FIG. 6. A keyway 471 extends from the forward end of shell 47 along part of the length of the shell, as illustrated in FIG. 4. One or more elongate, axially extending guide slots 472 are also provided in shell 47, and a key 39 extends radially outwardly from forward end plate 43 into each slot. Key 39 travels back and forth along slot 472 when the end plate or wall 43 slides back and forth during mating and unmating of the connector, and serves to guide the axial movement of the plate and helps to rotationally orient the end plate to the stationary components of the receptacle unit, along with sleeve 37 over which the opening 62 in the end plate engages (see FIGS. 6 and 15 to 19).

An oil fill port 56 extends through base 31 and is normally closed and sealed by fill port screw 21 and 0 ring 22. Port 56 allows the chamber 54 to be filled with oil. A tubular stem 33 has a rear end portion secured in a through bore 60 in base 31 which is aligned with end wall opening 67 and offset from the central axis of shell 47. Stem 33 extends forward from the base into guide sleeve 37. An optical contact assembly 46 is carried on the forward end of stem 33. The rear end portion of the stem 33 is retained in the bore in base 31 by a retaining ring 5 and the rear end of sleeve 37 and the stem are secured together and to a forward portion of the base 31 by a series of pins 38, which also serve as an anti-rotation feature to preserve the optical contact assembly in the correct position for engagement with the mating contact assembly in the plug unit, as described in more detail below. O-ring seals 4 are provided between the rear end portion of stem 33 and the bore in the base 31. O-ring seals 13 are also provided between the feed through 12 and the bore in the rear end portion of the stem 33.

Figure 12:
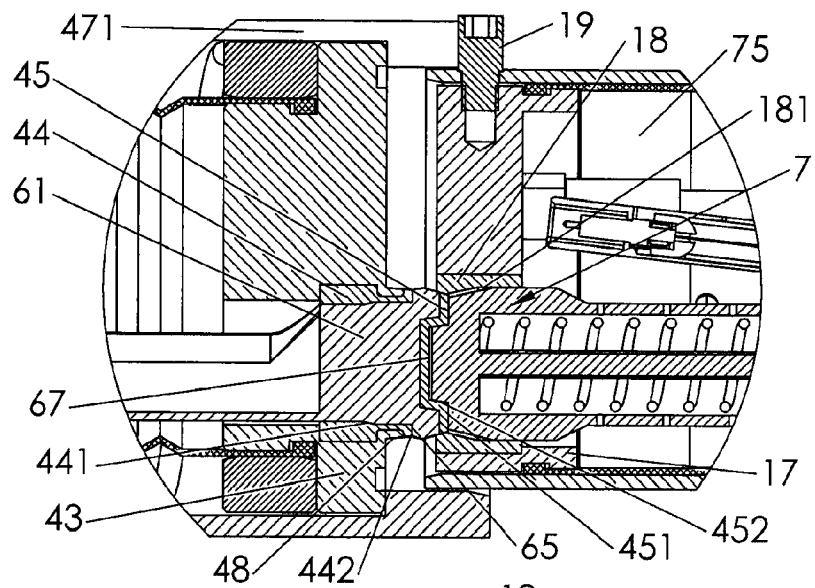
FIG. 12 is an enlarged cross-sectional view of the forward end portions of the plug and receptacle unit as they are brought together and the plug seal begins to engage the receptacle stopper.

A tubular or annular seal member 44 of elastomeric material is bonded in the forward portion of opening 62. Stopper 61 is in sealing engagement with seal member 44 to seal the opening 62 when the receptacle is in the unmated condition of FIGS. 4 and 6. The stopper projects a short distance from the forward end face of plate 43 in the unmated condition of the receptacle, as seen in FIGS. 4 and 6. As illustrated in FIG. 6 and 12, the plate 43 has a raised annular projection or rim 48 in its forward end face surrounding opening 62 and seal member 44 has a forward end bonded over the inner diameter and end face of the raised rim 48 to form the face seal against shoulder 65 of the stopper. The front end face of stopper 61 is shaped to provide a central circular indent and a gasket or seal member 45 of similar indented shape is secured by bonding or the like to the front end face of the stopper, forming a leak proof interface. As illustrated in FIGS. 4, 6 and 12, the seal member or gasket 45 has an annular rim or end face 451 and a central indent 67 with a tapered peripheral edge 452. The portion of the stopper 61 which projects forward from end plate 43 has a slight outward taper followed by an inward taper, as best seen in FIGS. 6 and 12, and the outer edge of the annular rim is tapered to match the taper of the inward projecting portion at the forward end of the stopper. The end face or rim 451 of gasket 45 is flat to form a flat face seal during mating of the receptacle and plug units, as described in more detail below.

As noted above, the seal member 44 has a forward end face which forms a face seal 442 against abutting shoulder 65 of the stopper 61 in the unmated condition of FIG. 6. The inner surface of the seal member 44 has a tapered portion forming a gland taper seal 441 which seals against a mating tapered portion of the stopper outer diameter in the sealed position illustrated in FIGS. 6 and 12. The close sealing engagement between the tapered inner surface portion of seal member 44 and the tapered outer surface portion of the stopper forms a gland taper seal. The seal member 44 therefore provides a combined face seal 442 and gland taper seal 441 which seals the oil chamber from the outside environment when the receptacle unit is completely disconnected from the plug unit, with the spring 36 urging the end plate and seal member into the extended position in sealing engagement with the stopper 61.

Receptacle optical contact assembly 46 comprises a housing or guide 66 having an open forward end and an optical ferrule 68 biased by a spring into the forward end portion of housing 66, as illustrated in FIG. 6. The optical contact assembly may be similar or identical to that described in patent application Ser. No. 11/279,474 filed on Apr. 12, 2006, U.S. Pat. Nos. 7,244,132, and 6,439,778, the contents of which are incorporated herein by reference. The optical ferrule 68 is a solid member of ceramic, metal, or hard plastic material, and has a plurality of spaced optical contacts in its forward end face. The optical contacts may be provided over substantially the entire outer end face of ferrule 68 if necessary, depending on the number of optical fibers to be connected. An optical ribbon fiber 69 or a bunch of individual ribbon fibers extends from the ferrule 68 through an optical feed through 12 and capillary in the rear end portion of stem 33, with the narrow-bore passageway or capillary suitably sealed by a known potting procedure. The optical ferrule 68 may carry any desired number of contacts and in one embodiment the ferrule is a 12 or 24 way optical MT ferrule, but may have 72 or higher fiber connections in alternative embodiments.

The receptacle base, stopper assembly and optical contact assembly are illustrated in more detail in FIG. 11. As illustrated in FIG. 11, the sleeve 37 has an elongate, slot-like opening 371 which extends from a location rear of stopper 61 to a location rear of the optical contact assembly 46, so as to expose the ferrule housing. Sleeve 37 also has a plurality of bleed holes 372 to allow oil in chamber 54 to enter and exit the rear end region of the sleeve.

The retainer ring 41 is shown separated from the base 31 in FIG. 11. Ring 41 is secured to the base 31 by screws 42 which extend through the ring into tapped holes 311 in the front face of the base. This secures the end of bladder 40 in the seating groove in the base 31.

The first connector unit or plug unit 70 is illustrated in an unmated condition in FIGS. 1, 2, and 5, while various separated parts of the plug unit are illustrated in more detail in FIGS. 7 to 10. Plug unit 70 has an outer rigid shell or housing 23 of metal or other rigid, strong material defining an internal cavity which is closed at the rear end by base 1 secured by fastener 20 and at the forward end by forward end wall or plate 17 which is secured to the shell and held at a predetermined spacing from base 1 by rigid standoff rods 8 which extend between the base 1 and the end plate 17, as best illustrated in FIGS. 5 and 7. O-ring seals 2 are provided between the plug shell 23 and base 1.

A key 19 which engages in an aligned radial bore in end plate 17 projects radially out of shell 23 for engagement in keyway 471 in the receptacle shell when the parts are mated together, for alignment purposes, as described in more detail below. End wall or plate 17 has an offset opening 72 which is aligned with the opening in the movable end plate 43 of the receptacle unit when the parts are mated. A tubular or annular front seal member 18 of elastomeric material is bonded in the opening 72.

A flexible compensator sleeve or bladder 15 extends between the base 1 and end wall or plate 17 and has a first end secured in a groove in the outer surface of end plate 17 by the surrounding portion of the shell. The second end of bladder 15 is secured in a groove in base 1 by the surrounding portion of the shell. Bladder 15 surrounds a contact chamber 75 extending between base 1 and end plate or forward end wall 17. Contact chamber 75 is filled with a mobile substance such as oil. Vent holes 231 in the shell 23 allow the outside environment to act against flexible bladder 15 for pressure compensation purposes. An oil fill port 76 extends through base 1 and is closed and sealed by fill port screw 21 and O-ring seal 22.

A plug stem 3, illustrated separately in FIG. 9, has a rear end portion 78 secured in a through bore 79 in the base by retaining ring 5. Stem mounting bore 79 is aligned with the opening in forward end wall or plate 17, and projects forwardly from base 1 along part of the length of the chamber 75. O-ring seals 4 are provided between the rear end portion 78 and through bore 79 (see FIG. 5) and an annular shoulder 301 is provided between the rear end portion 78 and the remainder of the stem. The plug stem has a bore 88 which is open at its forward end and a plurality of vent holes 302 are provided at spaced intervals on the forward portion of the stem.

A plug stopper assembly 7 is biased by spring 6 into an extended position in the unmated condition of FIG. 5, in which a stopper 85 extends into the opening 72 in the forward end plate 17 in sealing engagement with front seal member 18, as illustrated in FIG. 5. The stopper assembly 7 is illustrated in more detail in FIG. 8. An annular sleeve or skirt 86 extends rearwardly from stopper 85 and central, serrated shaft 703 extends from the stopper through sleeve 86 for engagement in the forward open end of the bore 88 in plug stem 3. Spring 6 extends between the shoulder 301 and the inner end face of stopper 85, and is retained at its forward end in the annular space between skirt 86 and the shaft 703. Skirt or sleeve 86 has a plurality of spaced vent holes 702. A pair of oppositely directed guide fins 701 project from the skirt at a spacing from stopper 85, and a guide projection or protuberance 704 extends from the skirt at a location spaced rearwardly from fins 701, as seen in FIG. 8. The guide fins 701 serve to guide the stopper assembly as it moves back and forth during mating and unmating, and engage against a spaced pair of the stand off rods 8, as indicated in FIG. 7. A shoulder 801 on the forward end of the stand off rods restricts forward movement of the stopper assembly and defines the forward position of stopper 85, which is illustrated in FIGS. 5 and 7.

Figure 13:
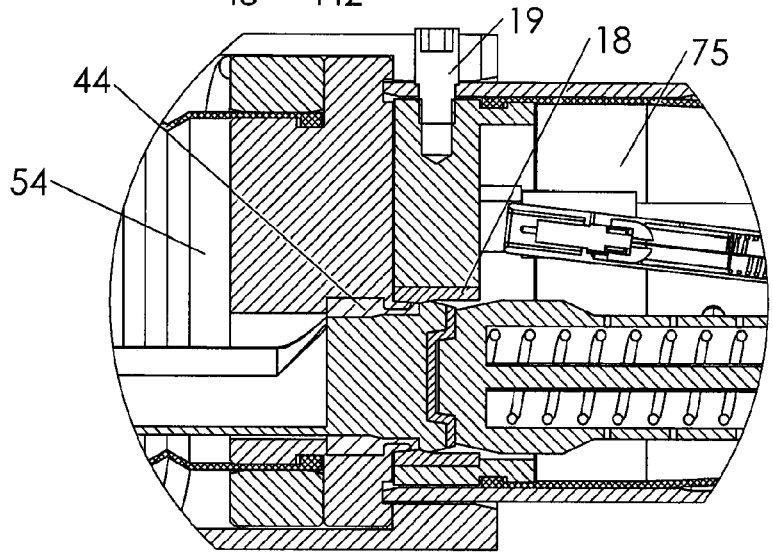
FIG. 13 is an enlarged cross-sectional view similar to FIG. 12 illustrating a subsequent stage when the plug seal has completed wiping and is fully sealed with the receptacle end plate seal.
Figure 14:
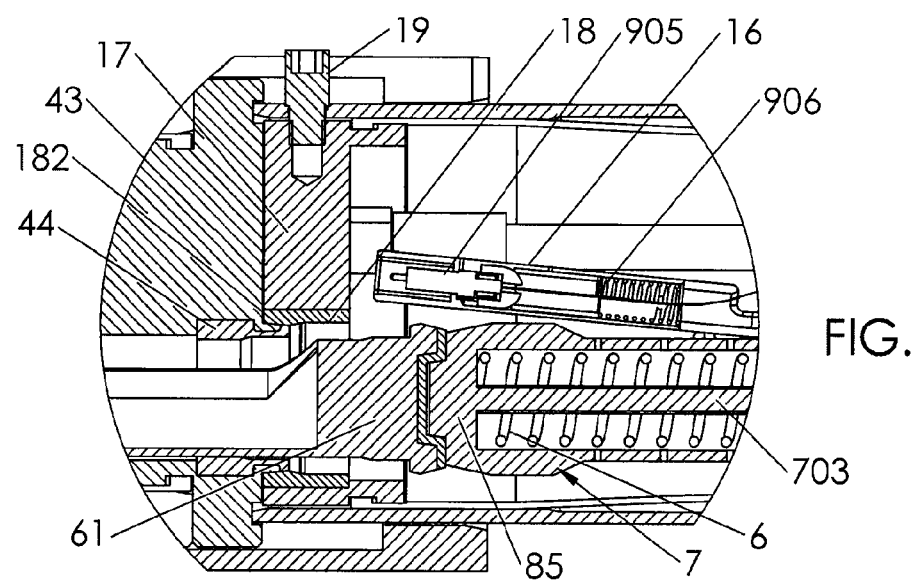
FIG. 14 is an enlarged cross-sectional view similar to FIG. 13 illustrating a subsequent stage in the mating engagement when the plug and receptacle seals are no longer in sealing engagement with the respective stoppers.

The forward end face of stopper 85 is the reverse of the receptacle stopper and end gasket 45, and has a central projecting boss 95 designed to engage the central indent of gasket 45 when the units are mated (see FIGS. 12 to 14). Boss 95 has a tapered peripheral edge for sealing engagement with the corresponding edge 452 of the central indent in gasket 45, as seen in FIG. 12. As best illustrated in FIG. 5, the annular seal member 18 has a forward end face 96 and a through bore with an inwardly tapered inner surface portion 181 which is in sealing engagement with a mating tapered outer surface portion of stopper 85 when the plug unit is in the unmated condition. This forms a gland taper seal.

A guide arm 9 extends from plug base 1 through the chamber 75 spaced transversely from the plug stem and stopper assembly, as illustrated in FIG. 5. The arm is pivotally mounted in the plug base at its rear end, and parts of the pivot assembly are shown separated in FIG. 10. Arm 9 has a pivot sleeve 903 at its rear end pivotally mounted on a transverse pivot pin 10 which engages at one end in a counter bore 103 at one side of a pocket or recess 101 in the forward end wall of plug base 1 and is secured at the opposite end in tapped hole 104, so as to extend transversely across the recess. A torsion spring 11 is also mounted around pivot pin 10 and has a first end mounted in a pin hole 102 at the rear of recess 101, and a second end extending into a pin hole 112 in the rear end portion or housing 114 of arm 9, as illustrated in FIGS. 5 and 10. Spring 11 biases the arm into an operative or mating position, as described in more detail below. The oil fill port 76 in the plug base 1 terminates in the end wall of recess 101, as best illustrated in FIG. 5.

As illustrated in FIG. 10, the arm 9 has a first straight portion 115 extending from rear housing 114 up to a first bend 116, an angled portion 118 extending from bend 116 up to a second bend 120, and a forward end portion or connector 902 for the plug optical contact assembly 16 extending from the second bend 120 generally parallel to the first portion 115. As indicated in FIG. 7, the plug optical contact assembly or insert 16 is designed for snap fit engagement with connector 902. Alternatively, the housing of contact assembly 16 may be bonded to connector 902 or formed as an integral extension of connector 902. The plug optical contact assembly comprises a housing or guide 904 having an open forward end and an optical ferrule 905 biased by a spring into the forward end portion of housing 904, as illustrated in FIG. 5. Arm 9 has an upwardly facing fiber guide slot 901 which extends up to bend 120. A small, downwardly facing semi-circular or elliptical recess 907 is located in the base of slot 901 adjacent rear housing 114.

The plug optical contact assembly is of similar structure to the receptacle optical contact assembly and is designed for mating engagement with the receptacle optical contact assembly. The contact assembly is similar or identical to that described in patent application Ser. No. 11/279,474 filed on Apr. 12, 2006, U.S. Pat. Nos. 7,244,132, and 6,439,778, the contents of which are incorporated herein by reference. The optical ferrule 905 is a solid member of ceramic, metal, or hard plastic material, and has a plurality of spaced optical contacts in its forward end face designed for engagement with corresponding contacts in the end face of the ferrule in the receptacle optical contact assembly when the plug and receptacle units are connected. The optical contacts may be provided over substantially the entire outer end face of ferrule 905 if necessary, depending on the number of optical fibers to be connected, and the number of contacts in the end face of ferrule 905 matches the number of contacts in the mating end face of ferrule 68. An optical ribbon fiber 906 or a bunch of individual ribbon fibers extends from the ferrule 905 along arm 9, towards the rear end of the plug shell. Arm 9 has an upwardly facing slot 901 for guiding the fibers or ribbon fiber. On approaching the base 1, the fiber 906 is diverted upwardly out of the slot 901 and through an optical feed-through 12 spaced radially outwardly from the arm pivot mount and then extends out of the base through a narrow-bore passageway or capillary suitably sealed by a known potting procedure. Optical feed through 12 is held in the base 1 by retainer ring 14 and is sealed by O-rings 13.

In the unmated or disconnected condition of FIG. 5, the protuberance 704 on the stopper skirt or sleeve 86 bears against the lower surface of the forward end portion 902 of arm 9 so that the arm is generally inclined upwardly at its forward end, away from stopper 85 and the opening 72 in the plug end wall or plate 17. The torsion spring 11 is adapted to bias the arm in a downward direction as viewed in FIG. 5, towards the stopper 85.

FIGS. 12 to 19 illustrate a mating sequence as the plug and receptacle units are connected together. As noted above, FIGS. 5 and 6 illustrate the plug unit 70 and the receptacle unit 80 in an unmated condition in which each contact chamber is sealed at the forward end by the respective stopper which is in sealing engagement with the respective seal members 18 and 44, which each provide a gland taper seal with the corresponding tapered outer surface portion of the respective stopper 85, 61. FIGS. 12 to 13 illustrate how the seal is maintained as the units are mated. The plug and receptacle units are moved together with their forward ends facing one another, and aligned so that the key 19 on the plug shell 23 enters keyway 471 at the forward end of the receptacle shell 47. When the key 19 enters keyway 471, the offset openings 72 and 62 in the end walls or plates of the plug and receptacle units are aligned. At the same time, the forward end portion of the plug shell enters the entry region 473 of the receptacle shell, and is moved inward into shell 47 until the forward end of plug stopper 85 engages the matching gasket 45 at the forward end of the receptacle stopper. FIG. 12 illustrates the key just entering keyway 471 while the boss or protuberance 95 at the forward end of the plug stopper 85 enters the indent 67 at the forward end of gasket 45, and the end faces 96 and 451 move into face to face, sealing engagement.

Since the stopper 61 which protrudes from the forward end wall or plate 43 of the receptacle is fixed while the stopper 85 at the front plate of the plug unit is movably mounted, further movement of the plug unit into the receptacle unit causes the stopper 85 to be pushed back through the end plate 17 and into the plug shell, compressing spring 6. FIG. 13 illustrates stopper 85 pushed partially through the opening 72, while FIG. 14 illustrates the stopper retracted inwardly completely out of opening 72. As noted above, the stopper is guided to move in a linear path after leaving opening 72 by the opposing guide fins 701 which are slidably engaged over two of the stand off rods 8 in the chamber 75. As the stopper is pushed inwardly, the serrated shaft 703 moves farther into the bore 88 in stem 3. The grooves in shaft 703 as well as the bleed holes 302 in the stem allow oil to exit the bore 88 as the shaft 703 is pushed into the bore, preventing binding.

At the same time, since the end wall or plate 17 in the plug unit is fixed while the end wall 43 in the receptacle unit is slidably mounted, the same movement of the plug shell into the receptacle shell brings the end walls 17 and 43 into engagement, so that end wall 43 and seal member 44 are pushed back into the receptacle shell, compressing spring 36. In FIGS. 12 to 14, the forward portion of annular seal 18 in the plug front wall opening engages or wipes over the outer surface of the receptacle stopper 61, and moves into sealing engagement with a forward portion of the seal member 44 and end plate 43, as indicated at 182 in FIG. 14. The wiping of the plug seal over the outer diameter of the receptacle stopper which initially protrudes from the front face of the receptacle front plate pushes any sand and silt out of the way and reduces the risk of any such material entering the oil chambers. This arrangement also produces wiper sealing during mating of the plug and receptacle units and prevents sea water from entering the connector during or after mating.

At the same time, the boss 95 protruding at the forward end of the plug stopper 85 moves into sealing, face to face engagement in the gasket 45 at the forward end of the receptacle stopper, while the peripheral rims 96 and 451 also come into face to face engagement, forming a gasket face seal 451 trapping any contaminants between the opposing faces. The mating boss and indent help to trap such contaminants and form a gasket taper seal between the edge 452 of gasket 45 and the opposing edge of the boss 95 of stopper 85, as illustrated in FIG. 12.

FIG. 15 illustrates the entire plug and receptacle unit at the initial mating stage illustrated in FIG. 12, in which the key 19 has just entered the keyway 471 and the end plates 43 and 17 are still spaced apart, while the end face of the plug stopper 85 is in sealing engagement with gasket 45 on the end face of receptacle stopper 61 which protrudes from receptacle end plate 43. At this point, the internal components of the plug and receptacle are in the same positions as they are when the units are unmated.

As the plug shell 23 is pushed farther into the receptacle shell 47, end plate 17 engages the movable end plate 43 and starts to push the plate 43 inward or rearward, compressing spring 36 and also collapsing the flexible bladder or compensator 40, while the fixed stopper 61 pushes the plug stopper 85 inward. This combined motion moves the plug and receptacle end plates completely over the plug and receptacle stoppers so that the plug and receptacle stoppers are located in the plug contact chamber 75, and a passageway between the plug and receptacle contact chambers 75, 54 is created through the aligned openings in the plug and receptacle end plates, as seen in FIG. 16. At the same time, the mating connector units are still sealed from the external environment by engagement between the plug and receptacle seal members 18 and 44 which is illustrated in FIGS. 12 to 14. In FIG. 12, the tapered inner surface at the forward end of the plug seal member 18 moves into sealing engagement with the tapered outer surfaces of the gasket 45 and receptacle stopper 61. Subsequently, the inner surface of seal member 18 engages over the protruding forward end portion of receptacle seal member 44 and end plate 43, and remains in this position throughout the mating engagement between the plug and receptacle units, forming a seal against any water entering the connected oil chambers. This sealing arrangement provides both gland taper sealing 181 and wiper sealing 182.

As the plug stopper 85 moves inwardly, along with skirt 86, the protuberance 704 on skirt 86 moves along the forward end portion 902, 16 of arm 9, approaching bend 120 and angled portion 118 of the arm. When the protuberance 704 moves past the bend 120, as in FIG. 16, the arm 9 moves towards the stopper 85 by the biasing force of torsion spring 11 until the bend 120 engages the outer surface of skirt 86, while the optical contact assembly or insert 16 rests against stopper 85.

Figure 17:
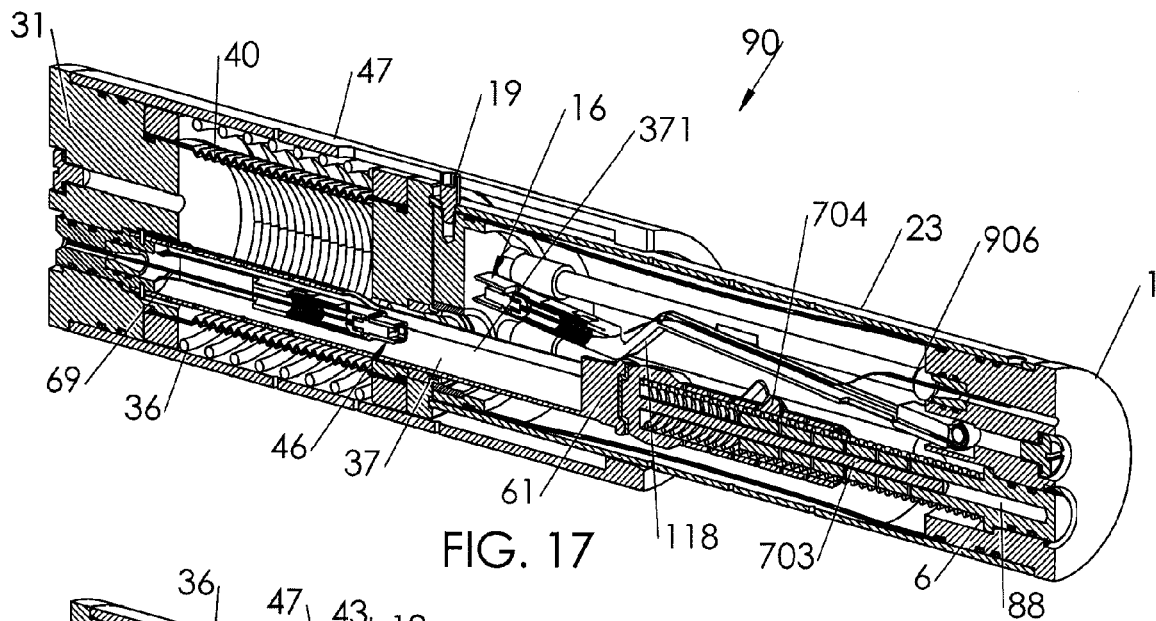
FIG. 17 is a sectional perspective view of the plug and receptacle units as the mating engagement proceeds beyond the position of FIG. 16.
Figure 18:
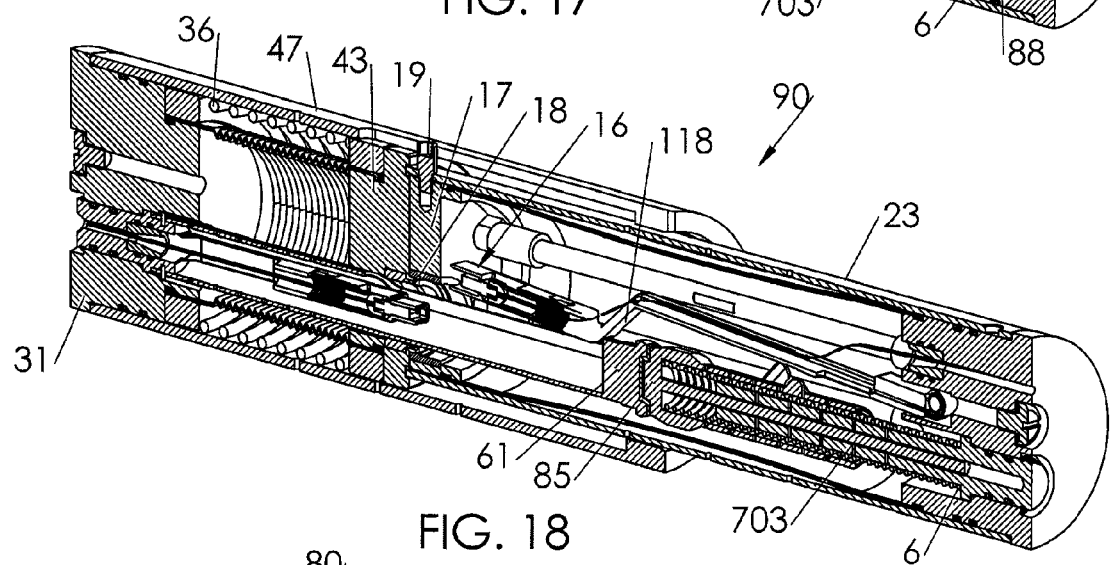
FIG. 18 is a sectional perspective view of the plug and receptacle units as the mating engagement proceeds beyond the position of FIG. 17.
Figure 19:
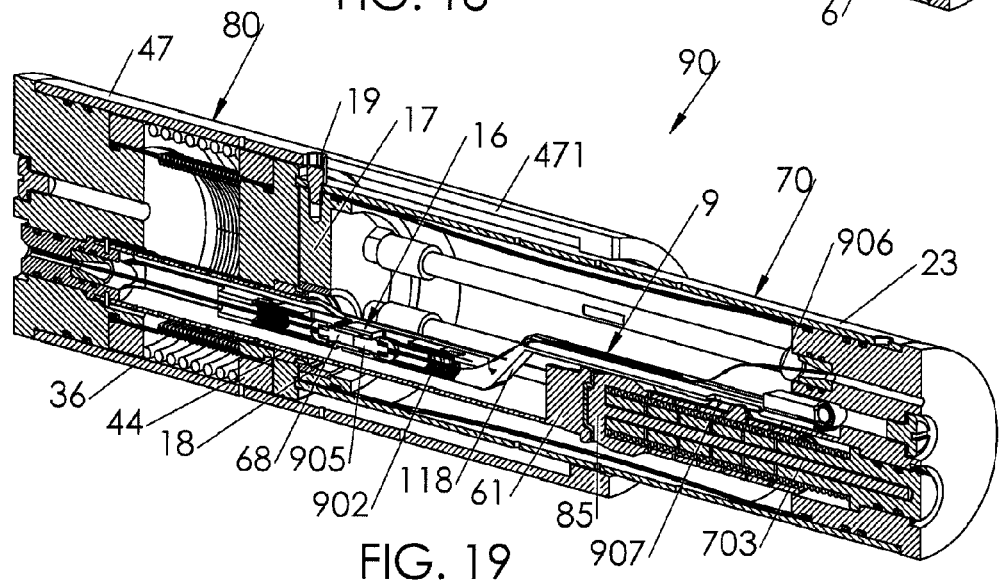
FIG. 19 is a sectional perspective view of the plug and receptacle units in the fully mated condition.

Further insertion of the plug shell 23 beyond the position in FIG. 16 moves the bend 120 past the stopper 85 to engage the receptacle stopper 61, as in FIG. 17. Subsequently, bend 120 clears the stopper 61 and the forward end portion of arm 9, including the optical contact assembly, starts to move towards the slot 371 in the receptacle sleeve 37, as illustrated in FIG. 18. At the same time, the plug end wall 17 continues to push back the receptacle forward end wall 43 over the sleeve 37 while the stopper 61 pushes back plug stopper 85, positioning slot 371 beneath the plug optical contact assembly 16, as seen in FIG. 17.

As the arm 9 continues to move forward and downward, the projection 704 enters the downwardly facing recess 907 at the rear end of arm 9 (see FIG. 19) which serves to restrict side to side movement of the arm, and also restricts further downward movement of the arm once it enters the slot 371, while providing sufficient room or play for the arm to align itself to the receptacle ferrule housing. Once both the bend 120 and angled portion 118 are completely clear of the stopper 61, the arm is biased downwardly as viewed so that the forward end portion 902, 16 engages in the sleeve 37. The engagement of projection 704 in recess 907 as the arm advances in slot 371 restricts side to side and downward movement of the forward end of the arm, while the spring 11 restricts upward movement. This helps to align ferrule housing 904 while providing sufficient room for the housing to engage over the forward end portion of ferrule housing 66 of the second or receptacle contact assembly. Once the ferrule housings engage, the ferrules 68 and 905 move into alignment, with a pin projecting from an end face of one of the ferrules engaging an opening in the end face of the other ferrule, as described in the prior patents referenced above. Face-to-face engagement between the contacts on the ferrule end faces allows optical communication between fibers or ribbon fiber 69 and fibers or ribbon fiber 906 in the two connector units. In alternative embodiments, additional locating or alignment mechanisms may be located in sleeve 37 to maintain the arm 9 and ferrule 905 in substantial alignment with ferrule 68.

If the connector is to be disconnected, the sequence of FIGS. 15 to 19 is reversed, with the plug shell retracted back out of the receptacle shell and the arm 9 engaging the stoppers 61, 85 which urge the arm back up out of the receptacle sleeve as soon as it has moved through the openings in the end plates 43 and 17. The forward end plates or walls 17, 63 remain in face to face engagement with the seal members 18 and 44 in sealing engagement until the plug stopper 85 starts to move back into engagement in the opening through seal 18, and seal 18 remains in sealing engagement with the outer rim of gasket 45 which also seals against the forward end face of plug stopper 85 until the stopper is again fully engaged with the seal 18 and the receptacle stopper is engaged with the receptacle seal member 44 just before the plug and receptacle unit are separated (see FIG. 12). This helps to keep the oil chambers sealed before, during, and after mating of the connector units.

This arrangement provides a high fiber count wet mate optical connector in a relatively compact connector, using known high density MT optical ferrules. The connector may be designed for simultaneous connection of 12, 24, 72 and higher fiber counts (single or multi-mode).

The various seal members may be of rubber or similar elastomeric material, and the bladders and bladder retainers may also be of rubber or the like. The plug and receptacle shells, front plates, stoppers, contact stems, and bases may be of metal or similar hard materials. Although the illustrated embodiment is a wet mate optical connector, electrical or hybrid electro-optical connectors may be provided in alternative embodiments.

In the illustrated embodiment, the forward end opening of each contact chamber is offset from the central longitudinal axis of the respective connector unit. This provides space in the plug or first connector unit 70 to accommodate the plug contact assembly and associated guide arm 9 when in the offset or inoperative position of FIG. 5. However, in alternative embodiments, the contact chamber openings may be coaxial with the central longitudinal axis of the respective connector units. In this case, the connector units may be of larger diameter for the same forward end opening dimension.

The connector as described above can be mated and unmated repeatedly in a harsh environment such as undersea at large ocean depths or in other hostile environments, in view of the sealing arrangement which keeps the contact chambers isolated from the surrounding environment before, during, and after mating. In this arrangement, each connector unit has an end wall with an off-center opening sealed by a stopper when the units are disconnected. The contact assembly in the receptacle unit is aligned with the opening in the end wall at all times, while the contact assembly in the plug unit is offset from the end wall opening and is biased into alignment with the receptacle contact assembly during the connection process, when the two contact chambers are connected through the end wall openings. During connection, the two stoppers move into one connector unit and away from the end wall openings while the plug contact assembly moves into the other connector unit through the aligned end wall openings and into engagement with the receptacle contact assembly. At the same time, seal members in the two end wall openings move into sealing engagement to seal the passageway between the chambers from the external environment.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A harsh environment connector, comprising:
   a first connector unit having a first outer housing, a first contact chamber within the outer housing having a forward end opening, and a first contact assembly within the contact chamber,
   a second connector unit having a second outer housing, a second contact chamber within the outer housing having a forward end opening, and a second contact assembly within the contact chamber;
   the connector units being movable from an unmated condition into a mated condition in which the connector units are in mating engagement and the contact assemblies are in communication, the forward end openings of the contact chambers being aligned and together forming a passageway between the contact chambers as the units are connected together;

a first stopper assembly in the first connector unit having a first stopper which closes the first opening in the unmated condition and a second stopper assembly in the second connector unit having a second stopper which closes the second opening in the unmated condition, the first stopper assembly being movable between an extended position in the unmated condition and a retracted position in the mated condition in which the first stopper is urged back through the forward end opening into the first contact chamber by the second stopper into a position in which both stoppers are spaced from the passageway to allow communication between the contact chambers;

first and second seal members in the first and second openings, respectively, each seal member providing a seal around the respective stopper in the unmated condition of the connector units; and at least one of the seal members sealing the passageway between the chambers as the units are moved into mating engagement.

2. The connector of claim 1, wherein the first seal member comprises a wiper seal which wipes over the second stopper as the second stopper moves through the passageway.

3. The connector of claim 1, wherein said seal members are elastomeric members which are substantially annular in shape.

4. The connector of claim 1, wherein the stoppers have opposing outer end faces, and an end seal member is mounted on the outer end face of at least one of the stoppers and forms a seal between the end faces as the connector units are moved into mating engagement.

5. The connector of claim 1, wherein one stopper end face has a projecting portion and the other stopper end face has a recess which receives the projecting portion as the connector units are moved into mating engagement.

6. The connector of claim 5, wherein an end seal member is mounted over an end face of at least one of the stoppers for sealing engagement with the other stopper as second stopper pushes the first stopper into the retracted position in the first connector unit, the end seal member having a shape which conforms to the shape of the end face over which it is mounted.

7. The connector of claim 6, wherein the end seal member forms a face seal with the opposing stopper end face as the connector units are moved into mating engagement.

8. The connector of claim 6, wherein at least part of the end seal member forms a taper seal with an opposing part of the opposing stopper end face as the connector units are moved into mating engagement.

9. The connector of claim 5, wherein said projecting portion comprises a central boss projecting from said one stopper end face and the recess comprises a central, circular indent in the other stopper end face which receives the central boss as the units are moved into mating engagement.

10. The connector of claim 1, wherein opposing portions of each stopper and annular seal member are tapered along at least part of their length to from a gland taper seal when the connector units are in the unmated condition.

11. The connector of claim 1, wherein one of the stoppers has a shoulder which is in sealing engagement with an opposing forward end face of the respective seal member when the connector units are in the unmated condition, whereby the opposing forward end face of the seal member forms a face seal.

12. The connector of claim 11, wherein said one stopper and respective seal member also have opposing tapered face portions extending along at least part of their length, the tapered face portions forming a gland taper seal spaced from said face seal in the unmated condition of the connector units.

13. The connector of claim 1, further comprising a biasing device which biases said first stopper into the extended position.

14. The connector of claim 1, wherein said first and second connector units further comprise first and second end walls, respectively, at forward ends of the respective first and second contact chambers, the first and second end walls having openings which are aligned as the units are mated and which comprise the first and second forward end openings of the respective first and second contact chambers.

15. The connector of claim 14, wherein the second end wall is movably mounted in the second connector unit to move between an extended position in the unmated condition and a retracted position in the mated condition in which the second stopper assembly projects through the passageway defined by the aligned openings in the first and second end walls, the first end wall engaging the second end wall and urging the second end wall into the retracted position as the units are moved into mating engagement.

16. The connector of claim 15, further comprising a biasing device which biases the second end wall into the extended position.

17. The connector of claim 15, wherein the movable end wall has a forward end face having a projecting annular rim which surrounds the opening.

18. The connector of claim 17, wherein the second seal member extends through the annular rim and over an end face of the rim.

19. The connector of claim 17, wherein the first seal member is in sealing engagement over said rim of the movable end wall when the connector units are in mating engagement.

20. The connector of claim 1, wherein each contact assembly comprises at least one circuit which terminates in a contact which is mated with the contact in the other contact assembly when the units are in mating engagement.

21. The connector of claim 20, wherein each contact assembly comprises a plurality of circuits which terminate in contacts which are mated with the contacts in the other contact assembly when the units are in mating engagement.

22. The connector of claim 20, wherein said circuits are optical circuits.

23. The connector of claim 20, wherein said circuits are electrical circuits.

24. The connector of claim 1, wherein the second contact assembly is aligned with the forward end opening of the second contact chamber and the first contact assembly is movable in a direction transverse to a longitudinal axis of the connector units between a first, inoperative position in which the first contact assembly is offset out of alignment with the forward end opening of the first contact chamber in the unmated condition of the connector units, and a second, operative position in which the first contact assembly is moved transversely relative to a longitudinal axis of the connector units into alignment with the forward end opening of the first contact chamber after the first and second stoppers have moved out of the passageway between the contact chambers during mating of the connector units, whereby further movement of the units into a fully mated condition simultaneously moves the first contact assembly axially into communication with the second contact assembly in a common chamber formed by the first and second contact chambers and the connecting passageway between the chambers.

25. The connector of claim 24, wherein the second connector unit has a base defining a rear end of said second contact chamber, and the second stopper assembly has a rear end secured in said base and a sleeve extending forward from said base over said second contact assembly, the stopper being secured at a forward end of said sleeve, the sleeve having an elongate slot extending rearward from said stopper through which the first contact assembly enters the sleeve as it moves from the first to the second position and aligns with the second contact assembly during mating engagement.

26. The connector of claim 24, wherein the first connector unit further comprises a biasing device which urges the first contact assembly towards the second operative position, and a stop member which holds the first contact assembly in the first position in the unmated condition of the connector units.

27. The connector of claim 26, wherein the stop member is located on the retractable first stopper assembly and is moved out of engagement with the first contact assembly as the first stopper is pushed back into the retracted position by the second stopper.

28. The connector of claim 24, further comprising a movable arm in the first housing having a pivotally mounted rear end and a forward end carrying the first contact assembly.

29. The connector of claim 28, wherein the first connector unit has a base defining a rear end of said first contact chamber and the rear end of the movable arm is pivotally mounted in said base.

30. The connector of claim 28, wherein the arm has a first bend spaced from the rear end which separates the arm into a first portion extending from the rear end to the first bend and a second portion extending at an angle to the first portion from the first bend towards the second end.

31. The connector of claim 30, wherein the first portion is angled away from the first stopper assembly and the second portion is angled towards the first stopper assembly in the offset position of the first contact assembly.

32. The connector of claim 31, wherein the first contact assembly extends at an angle to the second portion of the arm.

33. The connector of claim 31, wherein the first portion extends substantially parallel to the first contact assembly and to the first stopper assembly in the mated condition of the connector units.

34. The connector of claim 1, wherein the connector units each have a central longitudinal axis and the forward end openings of the contact chambers are offset from the central longitudinal axis of the respective connector units.

35. The connector of claim 1, wherein the contact chambers are filled with a mobile substance.

36. The connector of claim 35, wherein the mobile substance is a dielectric.

37. The connector of claim 36, wherein the contact chambers are filled with dielectric oil.

38. The connector of claim 35, wherein the mobile substance is a fluid.

39. The connector of claim 35, wherein each contact chamber has a rear end, a forward end in which said forward end opening is located, and a flexible bladder which surrounds each contact chamber and extends from the rear end to the forward end.

40. A harsh environment connector, comprising:
a first connector unit having a first outer housing, a first contact chamber within the outer housing having a forward end wall with a first opening, a first contact assembly within the contact chamber, and a first stopper which closes the first opening in an unmated condition of the connector unit;
a second connector unit which is releasably mateable with the first connector unit, the second connector unit having a second outer housing, a second contact chamber within the outer housing having a forward end wall with a second opening which is aligned with the first opening during mating to define a passageway connecting the contact chambers, a second contact assembly within the second contact chamber, and a second stopper which closes the second opening in an unmated condition of the second connector unit;
first and second seals in the respective first and second openings which surround and seal the respective stoppers in the respective openings prior to mating engagement;
the first stopper being retracted into the first contact chamber while the forward end wall of second contact chamber is retracted into the second outer housing during mating, separating the stoppers from the end wall openings and allowing communication between the contact chamber through the passageway, thereby forming a common contact chamber; and
the first contact assembly engaging the second contact assembly in the common contact chamber when the stoppers separate from the aligned end wall openings.

41. The connector of claim 40, wherein the first contact assembly is movable transversely during mating from a first, offset position offset from the first opening into a second, aligned position in alignment with the passageway and positioned for contact with the second contact assembly as the units move into mating engagement.

42. The connector of claim 40, wherein each connector unit has a central longitudinal axis and each end wall opening is offset from the central longitudinal axis of the respective connector unit.

43. The connector of claim 40, wherein the forward end wall of the first contact chamber urges the forward end wall of the second contact chamber rearward into the second outer housing and the second stopper urges the first stopper back into the first contact chamber during mating.

44. The connector of claim 43, wherein at least one of the first and second seal members forms a seal between opposing portions of the forward end walls of the connector units around the passageway formed by the aligned openings in the end walls as the stoppers move out of the respective openings during mating and when the units are in mating engagement.

45. The connector of claim 44, wherein the second stopper has a forward end portion which projects out of the second opening in the unmated condition and the first seal member wipes over the forward end portion of the second stopper during mating.

46. The connector of claim 44, wherein the first seal member moves into sealing engagement with opposing portions of the forward end wall of the second contact chamber surrounding the second opening before the first stopper moves away from the first seal member and into the first contact chamber, whereby the passageway between the chambers is sealed during the entire mating process.

* * * * *